United States Patent [19]
Cartlidge et al.

[11] Patent Number: 5,272,719
[45] Date of Patent: Dec. 21, 1993

[54] PLURAL OUTPUT POWER SUPPLY FOR INDUCTION HOLDING AND MELTING FURNACES

[75] Inventors: Jesse Cartlidge, Kobe, Japan; John H. Mortimer, Medford, N.J.; Oleg S. Fishman, Maple Glen, Pa.; Brian E. Potter, Medford, N.J.; Simeon Z. Rotman, Brooklyn, N.Y.

[73] Assignee: Inductotherm Corp., Rancocas, N.J.

[21] Appl. No.: 806,571

[22] Filed: Dec. 12, 1991

[51] Int. Cl.$^5$ ............................................. H05B 6/02
[52] U.S. Cl. ................................... 373/138; 373/147; 373/148; 373/150; 219/10.77; 363/96
[58] Field of Search ....................... 373/138, 147–150, 373/145, 78, 7, 135, 102, 104, 108; 219/10.41, 10.75, 10.77, 10.79, 480; 363/96, 136

[56] References Cited

U.S. PATENT DOCUMENTS

| | | | |
|---|---|---|---|
| 2,451,518 | 10/1948 | Strickland | 373/148 |
| 3,842,339 | 10/1974 | Hoffman | 363/136 |
| 3,925,633 | 12/1975 | Partridge | 219/10.49 |
| 4,280,038 | 7/1981 | Havas et al. | 219/10.77 |
| 4,403,327 | 9/1983 | Granstrom et al. | 373/80 |
| 4,532,583 | 7/1985 | Nemoto | 363/96 |
| 4,538,073 | 8/1985 | Freige et al. | 307/33 |
| 4,695,316 | 9/1987 | Cartlidge | 75/10.14 |
| 4,811,356 | 3/1989 | Havas | 373/148 |

Primary Examiner—Bruce A. Reynolds
Assistant Examiner—Tu Hoang
Attorney, Agent, or Firm—Seidel, Gonda, Lavorgna & Monaco

[57] ABSTRACT

A system for simultaneously melting metal and holding molten metal for treatment and the like comprises a plurality of separate induction furnaces, each having an induction coil. The induction coil of each furnace is arranged to inductively heat metal in its associated furnace. A plural-output power supply is operatively connected to the induction coils for supplying ac power to the coils. The power supply comprises at least one rectifier section having an output and a plurality of high-frequency inverter sections equal to the number of separate induction furnaces Each inverter section has an input operatively associated with the rectifier section output for receiving power from said at least one rectifier section and an output operatively connected to a respective one of the induction coils for supplying ac power to the induction coil. Switches are provided for selectably interrupting power from selected ones of said plurality of inverter sections to their associated induction coils.

14 Claims, 3 Drawing Sheets

PLURAL OUTPUT POWER SUPPLY FOR INDUCTION HOLDING AND MELTING FURNACES

FIELD OF THE INVENTION

The present invention relates to metal smelting and, in particular, to induction melting and holding furnaces.

BACKGROUND OF THE INVENTION

It is common in foundry operations to divide the smelting of metals into two operations, melting metal and holding melted metal in the molten state. Induction furnaces can be used for both operations.

To begin, a metal charge is melted in an induction furnace by applying electromagnetic power to the induction coil of the induction furnace. Melting requires a high power density (500 to 1000 kW per ton of metal) and, typically, the melting operation lasts from 25 to 40 minutes.

Following melting, holding the molten metal for treatment is often required prior to casting or pouring. During treatment, the necessary samples are taken and tested, alloy elements are added, and sometimes unwanted elements are removed from the molten metal. Sometimes the furnace is discharged very slowly during pouring to facilitate the requirements of the pouring process. During treatment and pouring, the required temperature for the molten metal must be maintained, and this is usually done by applying limited power to the induction coil of the induction furnace.

Clearly, melting and then holding the molten metal in the same furnace is an inefficient use of equipment. Thus, to better utilize equipment, melting and holding operations are usually carried out simultaneously in two adjacent furnaces. This can be done in several ways.

The first way is to use one induction coil power supply connected through a system of switches to two furnaces. To melt the charge in one furnace, the power supply is connected to the induction coil for that furnace. When melting is complete, the power supply is switched over to the other furnace, which has been loaded with cold charge, with no further power being supplied to the first furnace. Treatment and pouring of the molten metal in the first furnace is carried out without power. To prevent the molten metal from becoming to cool, it must be superheated when melting to account for temperature losses during holding. This requires a great deal of power to be applied during melting, and leads to inaccuracies in the final metal temperature after treatment.

A second approach is to use two furnaces each connected to its own dedicated power supply. This allows more flexibility than the first method since, when melting is complete, the power applied to the furnace can be reduced considerably to a level sufficient to hold the molten metal at the desired temperature. This also allows more accuracy, since the temperature of the molten metal can be controlled by the application of power to the furnace during holding. A disadvantage of this method is that the equipment is under-utilized. Since each power supply is capable of supplying full melting power, which greatly exceeds holding power, the result is that over 50% of the time the power supply is utilized to only about 10% of its capacity.

A third technique, which is described in U.S. Pat. No. 4,695,316, combines the above two approaches. In the third technique, one power supply is connected to two furnaces through a switching network. While one furnace is energized for melting, the other holds a previously melted charge. During the holding process, the switches are actuated to apply power to the holding furnace for a short time to maintain the temperature of the molten metal. Thereafter, the switches are actuated to apply power to the melting furnace to continue melting. Although this method provides temperature maintenance during holding and better utilization of equipment, it does have some drawbacks. The switches need to be operated extensively and are subject to premature wear. In addition, the metal in the holding furnace sometimes becomes superheated, with undesired effects.

It is an object of the invention to provide a separation of function between melting and holding furnace to increase equipment utilization, but without the disadvantages of prior techniques.

SUMMARY OF THE INVENTION

The present invention includes a system for simultaneously melting metal and holding molten metal for treatment and the like, comprising at least two separate induction furnaces each having an induction coil associated therewith, the induction coil of each furnace being arranged to inductively heat metal in its associated furnace; a plural-output power supply comprising at least one rectifier section having an output and a plurality of high-frequency inverter sections equal to the number of separate induction furnaces, each inverter section having an input operatively associated with the rectifier section output for receiving power from said at least one rectifier section and an output operatively connected to a respective one of the induction coils for supplying ac power to the induction coil, and switch means for selectably interrupting power from selected ones of said plurality of inverter sections to their associated induction coils.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

It is known to those skilled in the art of induction heating that a static semiconductor power supply used in induction heating operations comprises a multiphase semiconductor rectifier, a reactive power storage section, and a variable-frequency resonant inverter which supplies high-frequency alternating current to the induction coil of an induction furnace.

Two types of power supplies are known. One type, commonly referred to as a current-fed inverter, stores reactive power in a large inductor connected between the multiphase rectifier and resonant inverter. The other type, commonly referred to as a voltage-fed inverter, utilizes capacitors to store the reactive power.

Current-fed inverters usually utilize parallel resonant inverters, while voltage-fed inverters usually utilize series resonant inverters. The present invention is applicable to voltage-fed inverters.

Figure 1:
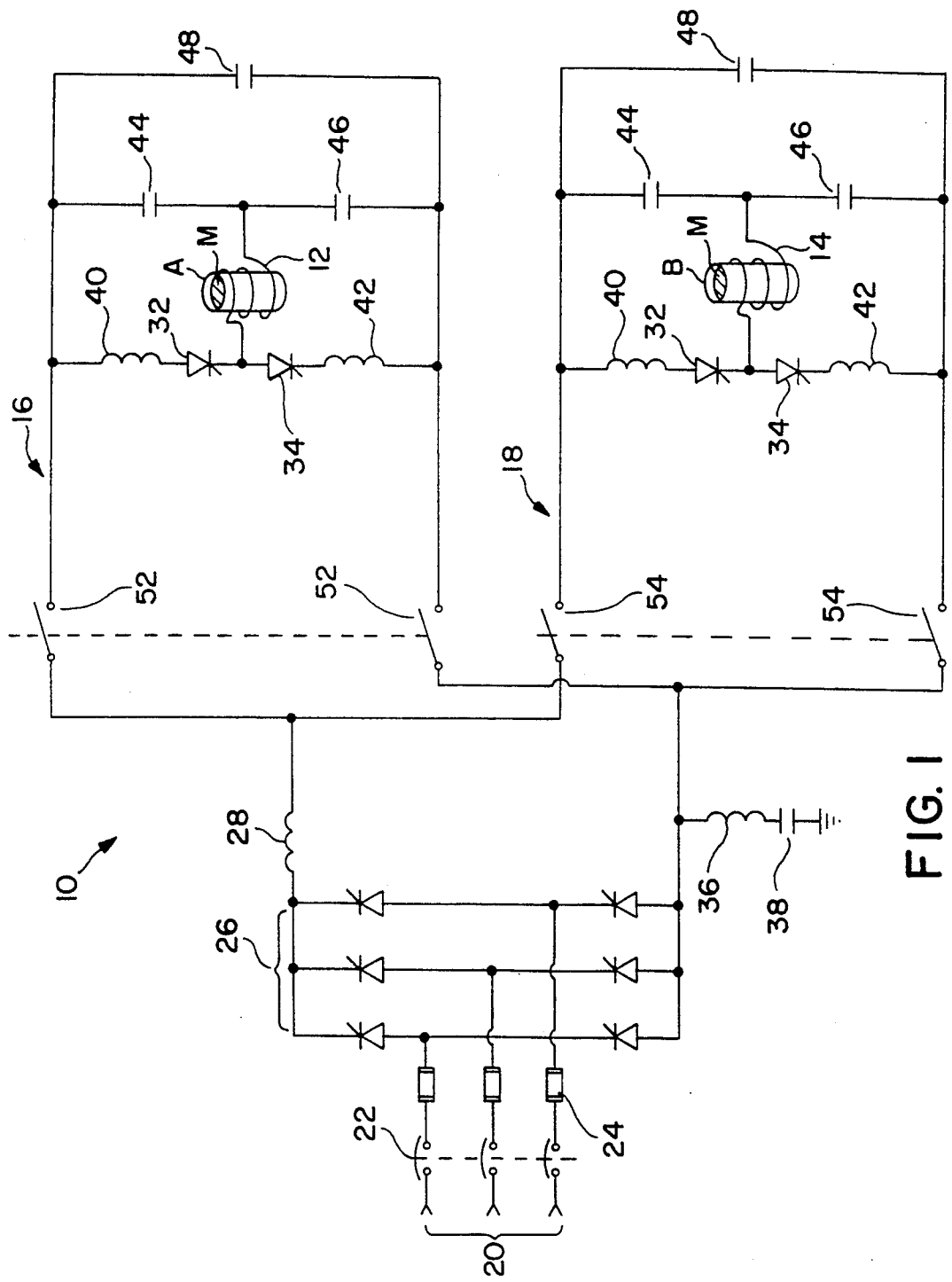
FIG. 1 is a simplified schematic diagram of the present invention.

Referring now to the drawings, wherein like numerals indicate like elements, there is shown in FIG. 1 a simplified schematic diagram of the present invention, generally designated by reference numeral 10. As illustrated in FIG. 1, the system according to the invention comprises two separate induction coils 12 and 14 which, in practice, are each associated with a separate induction furnace, such as but not limited to a coreless induction furnace with a crucible. Such furnaces are shown in FIG. 1 as A and B respectively having induction coils 12 and 14 wrapped therearound and each holding a molten metal M. The physical structure of an induction furnace will be well understood by those skilled in the art and need not be described in detail in order to understand the present invention.

Each of induction coils 12 and 14 is supplied with ac power for induction heating, melting, holding and the like, by separate power supply outputs from voltage-fed inverter sections 16 and 18, respectively. Inverter sections 16 and 18 are generally conventional and are fed by a three-phase ac line input 20. If desired, overcurrent protection in the form of fuses 24 or circuit breakers 22 may be provided. The three-phase ac input is rectified, i.e., converted from ac to dc, in rectifier section 26. A current limiting reactor 28, in the form of an inductor, is provided to limit the dc current output of rectifier section 26. All of the elements described so far are conventional and will be understood by those skilled in the art.

The output of rectifier section 26 is connected through reactor 28 and a switching circuit (described below) to the inputs of inverter sections 16 and 18. Inverter sections 16 and 18 are identical and, accordingly, only inverter section 16 will be described in detail, it being understood that inverter section 18 is identical. Inverter section 16 comprises switches in the form of SCRs 32 and 34, which are switched on and off at high frequency to "chop" the dc input to the inverter section to produce a high frequency ac current which flows through the inverter load, namely induction coil 12 (or induction coil 14, as the case may be). A ground fault circuit in the form of series-connected inductor 36 and capacitor 38 is provided from one side of the rectifier section output to ground. So-called "di/dt" reactors 40 and 42 are located in series with SCR switches 32 and 34, respectively, to control switching transients. Since the inverter sections 16 and 18 are voltage-fed inverters, tank capacitors 44 and 46 are provided to store reactive power not dissipated by the load. A filter capacitor 48 is provided across tank capacitors 44 and 46. Since inverter section 16 is, like rectifier section 26, conventional and will be understood by those skilled in the art, it need not be described in greater detail in order to understand the present invention.

Inverter sections 16 and 18 are connected to rectifier section 26 by switches 52 and 54. In the preferred embodiment, switches 52 and 54 are illustrated as mechanical DPST switches. However, it should be understood that any type of switch, such as a relay or semiconductor switch, or a permanent bus link, may be used without departing from the present invention. Switches 52 and 54 operate independently, and are preferably located between the output of rectifier section 26 and the inputs to inverter sections 16 and 18. Alternatively, switches 52 and 54 may be located between the outputs of inverter sections 16 and 18 and their associated induction coils 12 and 14, respectively.

As seen in FIG. 1, when switches 52 and 54 are open, as they are drawn in FIG. 1, each inverter section 16 and 18 is isolated from rectifier section 26, and power to the associated induction coil is interrupted. However, when switches 52 and 54 are closed, both inverters 16 and 18 are connected in parallel to the output of rectifier section 26. Accordingly, the total power output from both inverter sections 16 and 18 cannot exceed the total output power of rectifier section 26, plus a few percent for losses. Preferably, each inverter section 16 and 18 is designed to supply full rated power to its associated induction coil. For example, if full rated power to the induction coils 12 and 14 is 1000 kW, each inverter section will be designed to deliver 1000 kW to its associated induction coil, while the rectifier section will be limited to supplying 1000 kW. Since both inverter sections 16 and 18 are connected to rectifier section 26, each inverter section can use the current from the rectifier section and circulate reactive power through the tank capacitors in both inverter section.

Switches 52 and 54 operate independently. Therefore, they may be in the closed or open positions simultaneously, or one may be open while the other is closed. The present invention thus allows operation of both inverter sections 16 and 18 at the same time, forming in effect a single dual-output power supply. If each of the inverter sections is designed to supply 100% of full rated power to its associated induction coil, the power supplies can be used for melting and holding operations simultaneously, as long as the total power at the outputs of both inverter sections 16 and 18 does not exceed the total input rated power. For example, for purposes of illustration and not by way of limitation, if full rated power is 1000 kW, total input power to both inverter sections should be limited to 1000 kW, plus a few percent to compensate for internal losses. On the other hand, since the inverter sections will preferably be designed so that each is capable of producing 1000 kW, a maximum of 1000 kW can be applied to either of induction coils 12 and 14. Obviously, the total power of 1000 kW cannot be supplied to both induction coils 12 and 14 simultaneously, but can be shared between the two coils, which coincides with normal utilization of the system. Thus, if the furnace associated with induction coil 12 is used for holding, it will require, for example, 100 kW to maintain temperature, and the remaining 900 kW are available for the furnace associated with coil 14, which may be used for melting.

Conventionally, each inverter section 16 and 18 includes circuitry (not shown in FIG. 1) which monitors parameters such as output voltage and output current and, in response, varies the frequency at which SCR switches 32 and 34 are switched to control the output power to a desired, usually pre-set, power level. To allow the inverter sections 16 and 18 to be used for simultaneous melting and holding, the power level must be able to be varied in order to meet certain operational requirements: (1) the total output power from either inverter section should not exceed full rated power of the associated induction coil, and (2) when one inverter section is supplying power to the induction coil of the furnace being used for holding, the remainder of the power can be used for melting, but not the converse. This second condition means that variations in the power in the melting furnace should not affect the power applied to the holding furnace.

Figure 2:
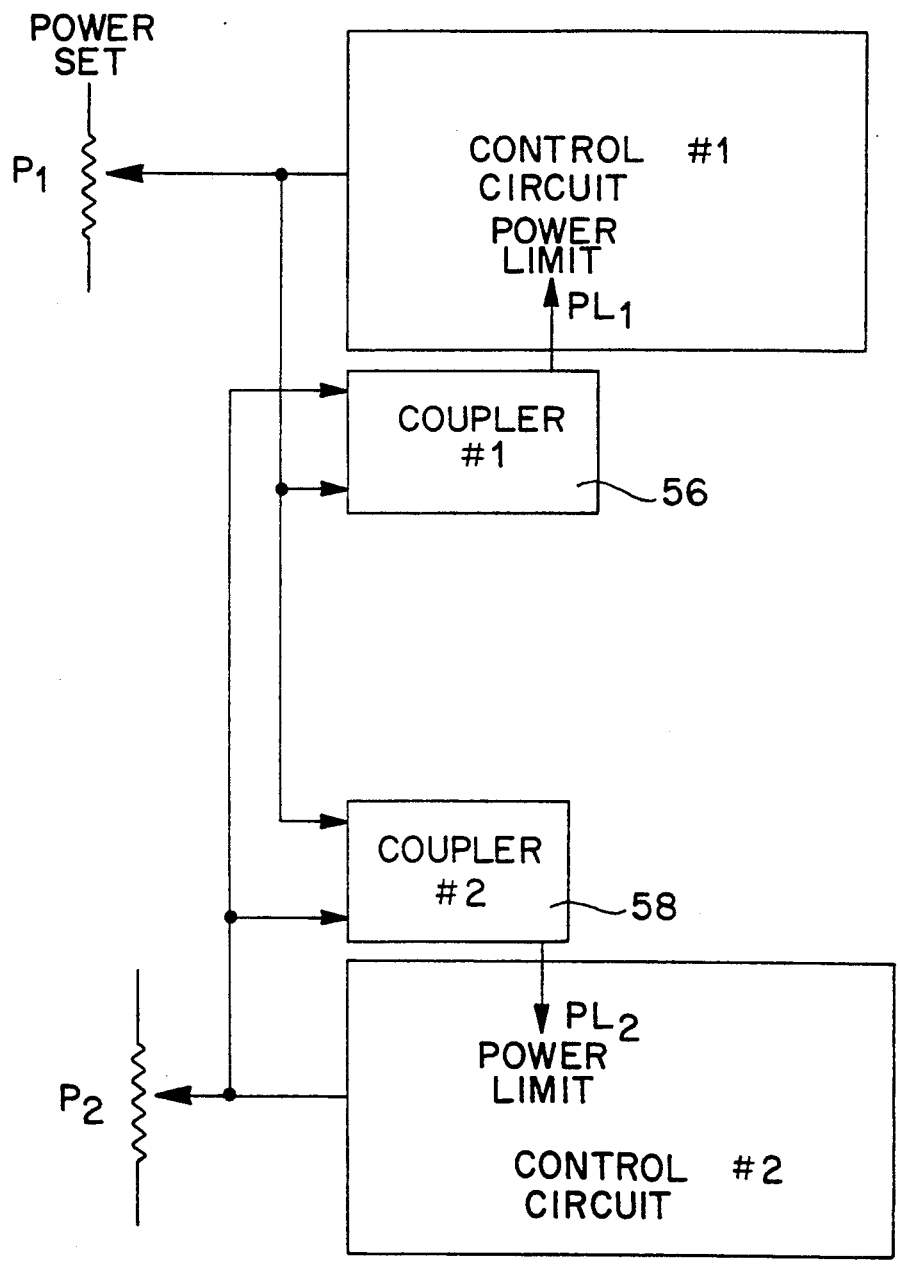
FIG. 2 is a simplified block diagram of a form of control circuit which may be used with the present invention.

The distribution of power between the two inverter sections 16 and 18 is facilitated by special coupler circuits which are connected to the conventional (and therefore not shown in detail) power control circuits for the two power supplies. The coupler circuits are illustrated in block diagram form in FIG. 2, and are designated with reference numerals 56 and 58. In FIG. 2, Control Circuit #1, associated with coupler circuit 56 may be thought of as associated with inverter section 16, and Control Circuit #2, associated with coupler circuit 58, may be thought of as associated with inverter section 18. The conventional control circuit associated with a given inverter section is set up to operate independently of the other control circuit. However, each coupler circuit receives as inputs the power settings to both control circuits. Coupler circuits 56 and 58 monitor the power settings of both control circuits and adjust the power limits of each control circuit accordingly.

Initially, the power limit of each of Control Circuits #1 and #2 is set at 50% of full rated power. This may be done by an external "power set" potentiometer or by any other suitable means such as a thumbwheel or other similar device. Signals Pl and P2 derived from the "power set" devices are typically voltage signals, which are individually applied to the associated Control Circuit in than 50% of $P_{TOTAL}$, comparators $C_1$ and $C_2$ will each generate a logic "1" at their respective outputs. The outputs of comparators $C_1$ and $C_2$ form the inputs to AND gate 60. The output of AND gate 60 is used to control switch $SW_1$. When both inputs to AND gate 60 are logic 1s, the output of AND gate 60 will also be a logic 1. When either input to AND gate 60 is a logic "0," the output of AND gate 60 will be a logic 0.

When the output of AND gate 60 is a logic 1, it will cause switch SW to be closed, and the output signal $PL_1$ from coupler circuit 56 will be equal to $P_{TOTAL}$ minus $P_2$. This signal is applied to Control Circuit #1, which increases the available power from inverter section 16 beyond the preset 50%. On the other hand, if any of the conditions are not met, that is, $P_1$ is not greater than $P_2$ or $P_2$ is not less than half of $P_{TOTAL}$, switch $SW_1$ will not be closed, and the available power from inverter section 16 will be 50% of total available power. There will in this case be no change in the setting of $P_2$ and therefore no change in the power level from inverter section 18.

Since coupler circuits 56 and 58 are identical, the operation of coupler circuit 58 is identical to that described above for coupler circuit 56, with the exception that signals $P_1$ and $P_2$ are interchanged.

In any case where it is attempted to draw more than 50% of total available power from both inverter sections, both would be limited to the preset 50% limit, since neither $P_1$ nor $P_2$ would be less than half of $P_{TOTAL}$, a required condition. This makes the system fail-safe to operate.

Although the invention is illustrated with a single rectifier section 26, it should be understood that two or more rectifier sections may be connected in parallel to increase the current capacity of the power supply 10.

The present invention may be embodied in other specific forms without departing from the spirit or essential attributes thereof and, accordingly, reference should known manner. The signals Pl and P2 are also applied to both coupler circuits 56 and 58. That is, the signal P1 is applied to Control Circuit #1, coupler circuit 56 and coupler circuit 58, and the signal P2 is applied to Control Circuit #2, coupler circuit 56 and coupler circuit 58. The output from each coupler circuit is applied to its associated Control Circuit. Thus, the output $PL_1$ of coupler circuit 56 is applied to Control Circuit #1, and the output $PL_2$ of coupler circuit 58 is applied to Control Circuit #2. Both coupler circuits 56 and 58 work identically, and therefore only the operation of coupler circuit 56 will be described in detail.

Figure 3:
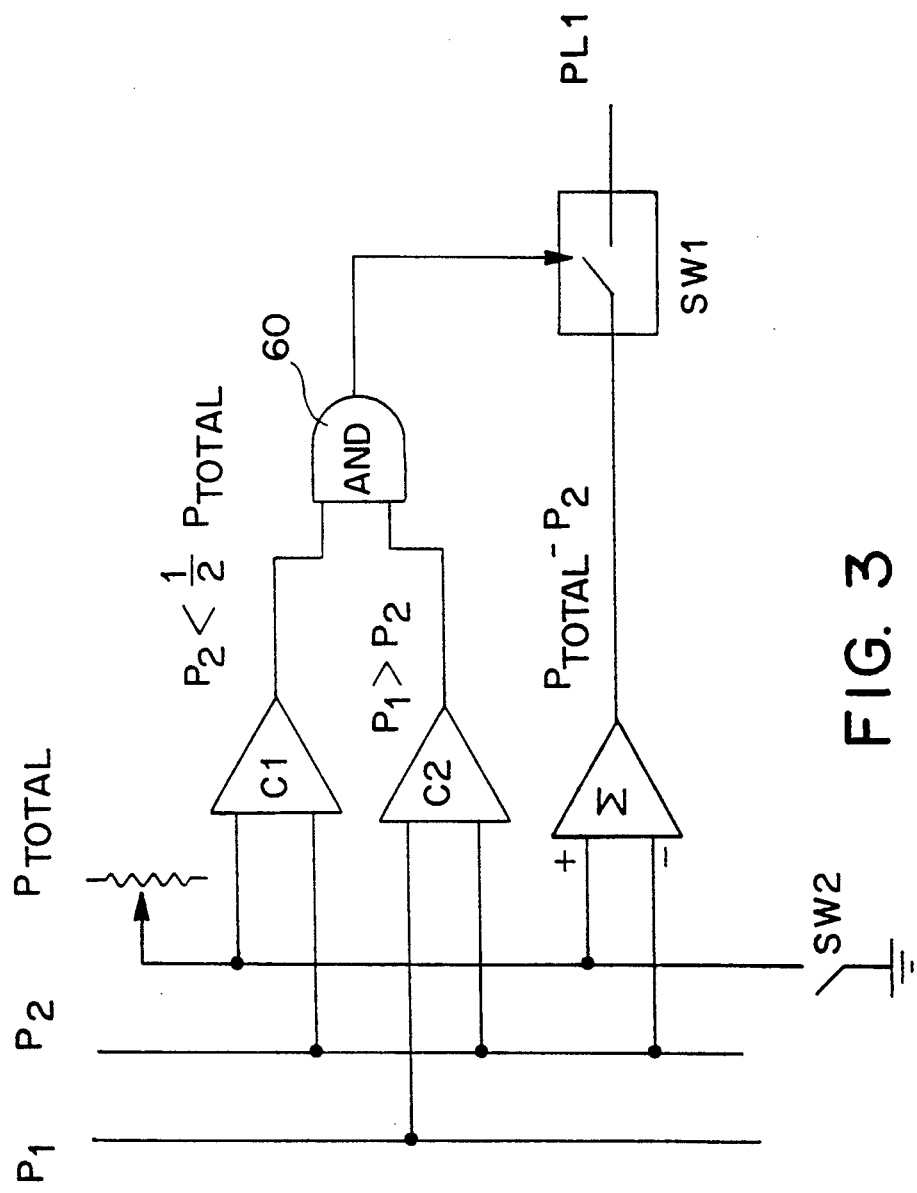
FIG. 3 is a simplified schematic diagram of a portion of the control circuit shown in FIG. 2.

Referring now to FIG. 3, coupler circuit 56 is shown in somewhat greater detail. Signals $P_1$ and $P_2$ constitute two of the inputs to coupler circuit 56. Signal $P_1$ represents the power set at Control Circuit #1 associated with inverter section 16, and signal $P_2$ represents the power set at Control Circuit #2 associated with inverter section 18. A third input signal, $P_{TOTAL}$, is derived from a "total power set" device such as a potentiometer or similar device. The signal $P_{TOTAL}$ represents the total power available from the rectifier section 26. The signals $P_{TOTAL}$ and $P_2$ are applied to a comparator $C_1$. Signals $P_1$ and $P_2$ are applied to a second comparator $C_2$. Signals $P_{TOTAL}$ and $P_2$ are also applied to a summing circuit, designated by the Greek letter $\Sigma$. Signal $P_{TOTAL}$ is applied to the positive input of summing circuit $\Sigma$ and signal $P_2$ is applied to the negative input, so that the output from summing circuit $\Sigma$ is equal to $P_{TOTAL}$ minus $P_2$. Operation of the coupler circuit will now be described, assuming that the furnace associated with inverter section 16 is the melting furnace and the furnace associated with inverter section 18 is the holding furnace.

Power on the "holding" inverter section 18, represented by signal $P_2$, is compared with the total available power, represented by signal $P_{TOTAL}$, and power on the "melting" inverter section 16, represented by signal $P_1$, is compared with $P_2$. If $P_1$ is greater than $P_2$, and $P_2$ is less be made to the appended claims, rather than to the foregoing specification, as indicating the scope of the invention.

We claim:

1. A system for simultaneously melting metal and holding molten metal for treatment comprising
    (a) at least two separate induction furnaces each having an induction coil associated therewith, the induction coil of each furnace being arranged to inductively heat metal in its associated furnace,
    (b) a plural-outputs power supply comprising at least one rectifier section having an output and a plurality of high-frequency inverter sections equal to the number of separate induction furnaces, each inverter section having an input operatively associated with the rectifier section output for receiving power from said at least one rectifier section and an output operatively connected to a respective one of the induction coils for supplying ac power to the induction coil, and
    (c) switch means for selectably interrupting power from selected ones of said plurality of inverter sections to their associated induction coils.

2. A system according to claim 1, wherein said switch means are located between the outputs of said plurality of inverter sections and their associated induction coils.

3. A system according to claim 1, wherein said switch means are located between the output of said at least one rectifier section and the inputs to said plurality of inverter sections.

4. A system according to claim 1, wherein the power supply comprises two rectifier sections, each having an output, said outputs being connected in parallel.

5. A system according to claim 1, further comprising means for apportioning the total power made available from and delivered to said induction furnaces from among said plurality of inverter sections.

6. A system according to claim 5, wherein the means for apportioning includes means for limiting the output of each inverter section to a preselected percentage of the total output power made available from all inverter sections.

7. A system according to claim 6, wherein the plurality of inverter sections is equal to two, and the preselected percentage is not greater than fifty percent.

8. A dual induction furnace system comprising:
   (a) first and second induction furnaces each having an induction coil associated therewith, the induction coil of each furnace being arranged to inductively heat metal in its associated furnace,
   (b) a dual-output power supply, each output being operatively connected to the induction coil associated therewith of the first and second induction furnaces, respectively, said power supply having at least one rectifier section with an output and two high-frequency inverter sections each having an input connected to the output of the rectifier section and each delivering power to the induction coil associated therewith, and
   (c) a switching network for selectably interrupting power from a selected one of the inverter sections to its associated induction.

9. A dual induction furnace according to claim 8, further comprising means for apportioning power delivered to said induction furnaces between the two inverter sections, said two inverters making available the total power to be delivered to said induction furnaces.

10. A dual induction furnace system according to claim 9, wherein the means or apportioning includes means for limiting the output of each rectifier section to not more than fifty percent of the total output power made available by said two inverters from both rectifier sections.

11. A dual induction furnace system for simultaneously melting metal and holding molten metal, comprising:
   (a) first and second induction furnaces each having an induction coil associated therewith, the induction coil of each furnace being arranged to inductively heat metal in its associated furnace,
   (b) a dual-output power supply operatively connected to the induction coils associated with the first and second induction furnaces, respectively, said power supply having at least one rectifier section with a dc output and a pair of high-frequency inverter sections each having an input connected to the dc output of the rectifier section and each delivering power to the induction coil associated therewith, said two inverters making available the total power to be delivered to said induction furnaces,
   (c) a switching network for selectably interrupting power from a selected one of the inverter sections to its associated induction coil, and
   (d) coupler circuit means operatively connected to each inverter section for apportioning the total power delivered to said induction furnaces between said inverter sections, the coupler circuit means including means for limiting the deliverable power of each inverter section to a preselected percentage of the total power output deliverable from both inverter sections.

12. A dual induction furnace system according to claim 11, wherein the preselected percentage is not more than fifty percent.

13. A system for melting and holding molten metal after melting, comprising
   (a) first and second induction furnaces, each furnace having an induction coil associated with it for heating metal in the furnace,
   (b) first and second high-frequency inverters connected to the induction coils of the first and second furnaces, respectively, for supplying power to the induction coils,
   (c) selector means for preselecting an amount of power supplied by each inverter to the induction coil connected thereto, and
   (d) circuit means interconnecting the first and second inverters for shifting a preselected portion of power from one of the inverters to the other inverter in response to actuation of the selector means for apportioning the power from both inverter sections between the induction coils connected to the first and second furnaces.

14. Method of simultaneously melting metal and holding molten metal for treatment, comprising the steps of
   (a) providing at least two separate induction furnaces each having an induction coil associated with it to inductively heat metal in the associated furnace,
   (b) supplying ac power to each induction coil from a power supply including at least one rectifier section having an output and a pair of high-frequency inverter sections each having an input connected to the rectifier section output and an output connected to one of said induction furnace induction coils, and
   (c) selectably interrupting power from a selected one of the inverter sections to its associated induction coil.

* * * * *